No. 752,113. PATENTED FEB. 16, 1904.
G. E. SAVAGE & G. W. HOPE.
COFFEE OR TEA POT.
APPLICATION FILED SEPT. 23, 1903.
NO MODEL.
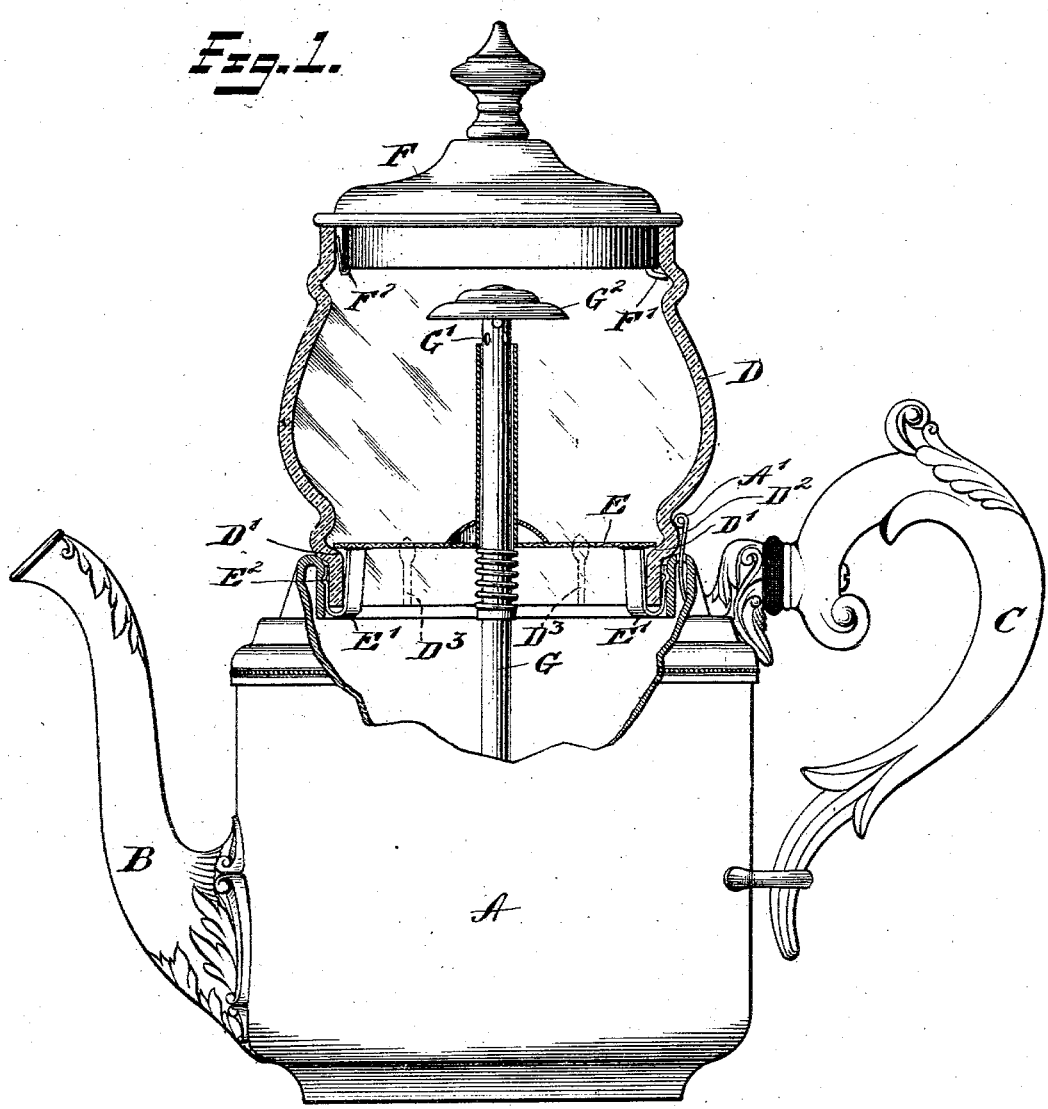
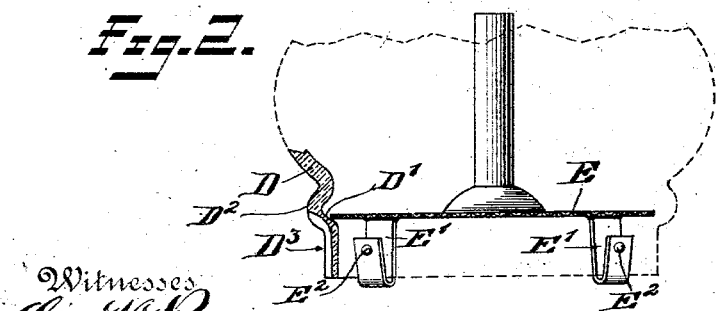
Witnesses
Inventors
George E. Savage
George W. Hope.
By their Attorney No. 752,113.

Patented February 16, 1904.

UNITED STATES PATENT OFFICE.

GEORGE E. SAVAGE AND GEORGE W. HOPE, OF MERIDEN, CONNECTICUT, ASSIGNORS TO MANNING, BOWMAN & CO., OF MERIDEN, CONNECTICUT, A CORPORATION OF CONNECTICUT.

COFFEE OR TEA POT.

SPECIFICATION forming part of Letters Patent No. 752,113, dated February 16, 1904.

Application filed September 23, 1903. Serial No. 174,341. (No model.)

*To all whom it may concern:*

Be it known that we, GEORGE E. SAVAGE and GEORGE W. HOPE, citizens of the United States, residing at Meriden, New Haven county, Connecticut, have invented certain new and useful Improvements in Coffee or Tea Pots, of which the following is a full, clear, and exact description.

Our invention relates to coffee-pots and the like; and it consists in the novel and useful features of mechanical construction hereinafter fully described. The construction comprises generally a reservoir in which water is placed, a separate reservoir in which ground coffee is placed, and a percolating device of improved construction suitably arranged relatively to these two chambers. When heat is applied, steam is generated, which is forced in a fine spray into the ground-coffee compartment and percolates through the coffee therein and filters back to the water-compartment, imparting to the latter the flavor of the seasoning element, whatever it may be. The heat may be continued until the desired strength or flavor has been imparted to the water.

The object of the invention is mainly to improve the construction, so that the process may be carried out in a most expeditious and effective manner.

Another object is to so construct the parts of the mechanism that none of them shall be lost during the working of the process or during the pouring of the beverage.

Figure 1 is a side elevation of a coffee or tea pot embodying my invention, parts being broken away to show the interior construction. Fig. 2 is a side elevation of the strainer and attaching-lugs with the outline of the receptacle.

A is a reservoir arranged to hold water that is finally to become the beverage.

B is a spout through which the beverage is to be poured.

C is a handle by which the coffee-pot may be inclined to the desired angle for pouring.

D is a receptacle arranged to hold the seasoning element. This receptacle is detachably secured to the reservoir A in the manner hereinafter described.

E is a strainer or filter which divides the chambers or spaces within the reservoir A and receptacle D. The strainer is provided with a multitude of small holes or perforations, through which the water may percolate after it has passed through the seasoning element, and it is also provided with a passage, located preferably substantially in the center of the same and arranged to receive the percolator-tube G. The receptacle D is preferably made of glass. D' is a ledge thereon to support the strainer E.

E' E' are spring-clips secured to the strainer and extending downward and around the lower edge of the receptacle D, the ends of said clips being turned outwardly and upwardly at the lower outer edge of the receptacle D, so as to frictionally hold the receptacle in place in the opening in the top of the reservoir A when the parts are assembled. A' is a clip carried by the reservoir A, preferably adjacent to the handle C, the nose of said clip overstanding a bead $D^2$ on the outer side of said receptacle D. These clips E' A' serve as means to securely hold the parts A and D from accidental disengagement and are useful not only to prevent looseness of the interior parts during the process of making the beverage, but also when the beverage is being poured. By extending the clips E' outwardly and upwardly around the lower and outer edge of the receptacle D the strainer E is more firmly held in place upon its seat on the ledge D' than would otherwise be the case, and hence said strainer being held in intimate engagement with the ledge D' prevents any of the coffee-grounds or particles of the seasoning element, whatever it may be, from working around the edge of the said strainer and dropping into the reservoir A. If desirable, the clips E' E' may be provided with nibs $E^2$, projecting outwardly to further frictionally hold the parts in secure engagement. Since the strainer E has no depending flange, access may always be had to the interior lower part of the receptacle D for the purpose of cleaning, and no partially-inclosed space is present wherein particles of the seasoning element may accumulate.

F is a cover for the receptacle D. F' is a hook thereon, the same being arranged to engage underneath the ledge at the upper portion of the receptacle D. The function of the hook F' is to prevent the cover from falling off when the pot is tilted. A spring-clip $F^2$ may also be provided on the cover F to supplement the hook F' in securely holding the cover in place.

G is a percolator-tube which passes up from the reservoir A through the strainer and into the space within the receptacle D. This percolator may be of any preferred form. The particular form herein shown is described and claimed in an application filed September 23, 1903, by George E. Savage and James W. Chapman, Serial No. 174,340. G' represents perforations in the upper end of said tube, and $G^2$ is a deflector above said perforations.

$D^3$ represents grooves, which are preferably formed in the lower outer surface of the receptacle D to provide vents to permit any excess steam generated within the reservoir A to flow out. When heat is applied underneath the reservoir A, steam is generated and conducted upwardly through the tube G, so as to pass out through the perforations G', whereupon it is deflected downwardly against the seasoning element in a more or less condensed form, through which seasoning element it passes and percolates, returning to the liquid within the reservoir A.

What we claim is—

1. In an apparatus of the character described, a liquid-reservoir, a detachable receptacle for the seasoning element provided with a perforated strainer separating the chambers within said reservoir and receptacle, a support for said strainer in said receptacle, and clips connected to said strainer and engaging the lower edge of said receptacle projecting outside of the same, the projecting ends of said clips serving to retain the receptacle thereon in said reservoir.

2. In an apparatus of the character described, a liquid-reservoir, a detachable receptacle for the seasoning element provided with a perforated strainer separating the chambers within said reservoir and receptacle, a supporting-ledge within said receptacle upon which said strainer rests, spring-clips connected to said strainer and projecting around the lower edge of said receptacle and upwardly outside of said lower edge, the free ends of said clips being yielding and arranged to frictionally engage with the liquid-reservoir when the parts are assembled.

3. In an apparatus of the character described, a liquid-reservoir, a detachable receptacle for the seasoning element provided with a perforated strainer separating the chambers within said reservoir and receptacle, means for holding said strainer in place in said receptacle and means carried by said strainer to engage with the reservoir, and means carried by the reservoir and arranged to engage with said receptacle, the two latter means coöperating to hold said parts against accidental disengagement when the same are assembled.

4. In an apparatus of the character described, a liquid-reservoir, a detachable receptacle for containing the seasoning element provided with a perforated strainer dividing the chambers within said receptacle and reservoir, and means carried by the receptacle for frictionally holding the same to the reservoir, and means carried by the reservoir for frictionally holding the same to the receptacle, said means coöperating to prevent accidental disengagement of said parts when the same are assembled.

5. In an apparatus of the character described, a liquid-reservoir, a detachable receptacle for holding the seasoning element, means arranged to frictionally hold said parts against disengagement when the same are assembled, said receptacle having grooves or channels adjacent to the line of junction and between said parts, and vent-passages to permit the escape of surplus steam or gases generated within said reservoir.

Signed at Meriden, Connecticut, this 19th day of September, 1903.

GEORGE E. SAVAGE.
GEORGE W. HOPE.

Witnesses:
  E. J. POOLEY,
  JAS. W. CHAPMAN.